United States Patent
Takikura et al.

(10) Patent No.: US 6,874,717 B2
(45) Date of Patent: Apr. 5, 2005

(54) RECIPROCATING DEVICE FOR SPINNING REEL

(75) Inventors: Koji Takikura, Izumi (JP); Takeshi Ikuta, Sakai (JP); Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/602,607

(22) Filed: Jun. 25, 2003

(65) Prior Publication Data

US 2004/0035968 A1 Feb. 26, 2004

(30) Foreign Application Priority Data

Aug. 26, 2002 (JP) ........................................ 2002-245686

(51) Int. Cl.$^7$ .............................................. A01K 89/01
(52) U.S. Cl. ...................................... 242/242; 242/278
(58) Field of Search ................................ 242/241, 242, 242/277, 278, 279

(56) References Cited

U.S. PATENT DOCUMENTS

| | | | | |
|---|---|---|---|---|
| 5,316,239 A | * | 5/1994 | Sugawara | 242/241 |
| 5,350,130 A | * | 9/1994 | Hitomi et al. | 242/241 |
| 5,829,699 A | * | 11/1998 | Tsutsumi | 242/241 |
| 5,934,586 A | * | 8/1999 | Kang et al. | 242/241 |
| 5,984,220 A | * | 11/1999 | Kawabe | 242/241 |
| 6,102,315 A | * | 8/2000 | Sato | 242/249 |
| 6,290,157 B1 | * | 9/2001 | Shibata | 242/241 |
| 6,394,380 B2 | * | 5/2002 | Takikura | 242/279 |
| 6,460,792 B1 | * | 10/2002 | Morimoto et al. | 242/241 |
| 6,484,956 B2 | * | 11/2002 | Kawabe et al. | 242/278 |
| 6,655,619 B2 | * | 12/2003 | Kitajima | 242/241 |

* cited by examiner

*Primary Examiner*—Emmanuel Marcelo
(74) *Attorney, Agent, or Firm*—Shinjyu Global IP Counselors, LLP

(57) ABSTRACT

An oscillating mechanism is for reciprocating a spool in a spool shaft direction in cooperation with rotation of a handle. The oscillating mechanism includes a slider member, a gear member, and a guide shaft. The slider member is mounted at least axially immovably to a spool shaft, on the fore end of which the spool is mounted. The gear member reciprocates the slider member in the shaft axial direction in cooperation with rotation of the handle. The guide shaft is supported at two locations of its outer circumferential surface with the reel unit, has an annular groove to which a retainer can be attached for preventing disengagement of the guide shaft in one axial direction, and guides the slider member in a direction substantially parallel to the spool shaft. In this way, structure for retaining a guide shaft is simplified and design constraint alleviated.

10 Claims, 14 Drawing Sheets

RECIPROCATING DEVICE FOR SPINNING REEL

BACKGROUND OF THE INVENTION

1. Field of the Invention

This invention generally relates to reciprocating mechanisms. More specifically, the present invention relates to reciprocating mechanisms for spinning reels for reciprocating a spool mounted to a reel unit of a spinning reel along a spool shaft axis in cooperation with rotation of a handle.

2. Background Information

A spinning reel that winds fishing line around the shaft that extends along the longitudinal direction of a fishing rod is provided with an oscillating mechanism (an example of reciprocating mechanism) for reciprocating a spool back and forth for winding fishing line. Among known examples of oscillating mechanism of this type are a gear-down type oscillating mechanism and a traverse cam type oscillating mechanism.

The gear-down type oscillating mechanism includes a gear member that rotates around an axis parallel to a handle shaft, and a slider member that reciprocates along a direction of the spool shaft by rotation of the gear member. The gear member meshes with a drive gear that is provided on a rotation shaft of the handle. A peripheral rim portion of one side face of the gear member has a cam lobe formed thereon. The slider member has a cam-engaging groove formed on its side face opposing the gear member such that the cam-engaging groove engages with the cam lobe. The cam-engaging groove generally extends linearly orthogonal to the spool shaft. To the slider member, a rear-end portion of the spool shaft is fixed, while the spool is mounted to the fore end of the spool shaft. The slider member is supported by a guide portion provided on the reel unit so as to be able to move freely back and forth.

In the gear-down type oscillating mechanism with this structure, when the gear member is rotated in cooperation with rotation of the handle, the cam lobe slides engaging with the cam-engaging groove, by which rotational motion of the gear member is converted into linear motion of the slider member. In this manner, the spool reciprocates back and forth.

The traverse cam type oscillating mechanism on the other hand includes a worm shaft arranged parallel to spool shaft and the engaging member having intersecting spiral grooves formed thereon, a slider member having an engaging member engaging with the worm shaft, and an intermediate gear fixed to the worm shaft and meshing with a pinion gear. The slider member is supported by a guide portion provided on the reel unit so as to be able to move freely back and forth.

In the traverse type oscillating mechanism with this structure, when the intermediate gear is rotated in cooperation with rotation of the handle, the worm shaft accordingly rotates. Then, the engaging member engaged with the worm shaft converts rotation of the worm shaft into forward and rearward liner motions for the slider member. In this manner, the spool reciprocates back and forth.

In either of the oscillating mechanisms, the configuration in which the guide portion for guiding the slider member along the spool axis is configured by a guide shaft that is arranged parallel to the spool shaft is known. The guide shaft is inserted from a through hole formed in a rear-end portion of the reel unit toward the front and is supported at two locations in the front and rear of the reel unit. The fore end of the guide shaft is coupled to the reel unit so as not to move further forward. The rear end of the guide shaft is prevented from disengaging in the axial direction by a plate-shaped retainer member that blocks the support portion at the rear end side from outside. The retainer member is secured to the reel unit with a screw, and the rear portion of the reel unit including the retainer member is covered by a cover member.

In the foregoing conventional configuration, the retaining member is mounted on the guide shaft at its rear end of its insertion direction with a screw in either type of the oscillating mechanism. This necessitates a retainer member and a fixing means such as a screw for fixing it, making the structure for retaining the guide shaft complicated and leading to a factor for increasing manufacturing cost of the mechanism. Moreover, since the retainer member needs to be fitted in the rear portion of the reel unit with a screw, space for fitting the retainer member is required in the rear portion, which restricts design of the reel unit.

In view of the above, there exists a need for a reciprocating mechanism of a spinning reel which overcomes the above mentioned problems in the prior art. This invention addresses this need in the prior art as well as other needs, which will become apparent to those skilled in the art from this disclosure.

SUMMARY OF THE INVENTION

Accordingly, a purpose of the present invention is to provide a reciprocating mechanisms of a spinning reels, whose structure for retaining the guide shaft is simplified such that constraints in designing the reel unit are reduced.

A reciprocating mechanism of a spinning reel according to the present invention is a mechanism for axially reciprocating, in cooperation with rotation of a handle furnished on the spinning-reel reel unit, a spool mounted fore-end wise on a spool shaft provided in the reel unit. The spinning reel reciprocating mechanism includes a reel unit, a sliding member, shifting means, and at least one guide shaft. The handle and the spool shaft are furnished on the reel unit. The sliding member is mounted on the spool shaft immovably relative to the spool shaft in at least the spool shaft axial direction. The shifting means is for reciprocating the sliding member in the shaft axial direction in cooperation with handle rotation. At least one guide shaft is supported by the reel unit in a plurality of locations on at least its outer circumferential surface and has a position-restricting portion for preventing the guide shaft from being disengaged from the reel unit in at least one axial direction. The guide shaft is for guiding the sliding member in a direction substantially parallel to the spool shaft.

In this reciprocating mechanism, when the guide shaft is inserted from, for example, the rear of the reel unit, the outer circumferential surface is supported on the reel unit, and the position-restricting portion determines the position of the shaft with respect to at least one axial direction. Therefore, by retaining its fore end by the reel unit, the guide shaft is prevented from disengaging in both directions. Thus, the guide shaft is retained by the position-restricting portion. Therefore, complicated structures such as a retaining member fastened by a screw are unnecessary for the retaining. In addition, the retainer member needs not be fitted in the rear portion of the reel unit, which makes the space for mounting unnecessary. Thus, constraints in designing the reel unit are reduced.

Preferably, a reciprocating mechanism of a spinning reel according to the the present invention is the mechanism wherein the guide shaft is inserted, along the axial direction of the guide shaft, through a plurality of support portions aligned along the shaft axial direction in the reel unit, and its outer circumferential surface is entirely circumferentially supported by the plurality of support portions. The position-restricting portion has an annular groove and a retainer member that is fittable into the annular groove. The retainer member contacts one of the plurality of support portions, on a surface opposite where the guide shaft is inserted, to prevent disengagement in a direction opposite the direction in which the guide shaft is inserted. In this case, retaining in the insertion direction can be attained by contacting the fore end with the reel unit. In addition, by fitting an appropriate retaining member such as a snap ring into the annular groove, the guide shaft is easily prevented from disengaging in the insertion direction and the opposite direction.

Preferably, a reciprocating mechanism of a spinning reel according to the present invention is the mechanism wherein the retainer member is a snap ring detachably and elastically locked in the annular groove. In this case, by fitting a C-shaped or E-shaped snap ring into the annular groove, the guide shaft is easily prevented from disengaging.

Preferably, a reciprocating mechanism of a spinning reel according to the present invention is the mechanism wherein the retainer member is a retaining spring formed by bending a metal wire into a hairpin contour, and locked detachably and elastically in the annular groove. In this case, by fitting the retaining spring into the annular groove, the guide shaft is easily prevented from disengaging.

Preferably, a reciprocating mechanism of a spinning reel according to the present invention is the mechanism wherein: the reel unit includes a reel body having a housing space in the interior thereof, and a lid member detachably fixed to the reel body and closing the housing space. The position-restricting portion includes an annular groove on an outer circumference of the guide shaft and a plate-shaped member that having a U-shaped groove that is detachably and reattachably fitted into the annular groove. The plate-shaped member is pressed toward the guide shaft by the lid member.

Preferably, a reciprocating mechanism of a spinning reel according to the present invention is the spinning reel reciprocating mechanism wherein the retainer member is contacting one of said plurality of support portions on a side closer to a side of said reel unit on which fishing line is reeled out. In other words, the guide shaft is inserted from a rear portion of the reel unit that is opposite a side thereof from which fishing line is reeled out. In this case, when the guide shaft is inserted from the rear portion of the reel unit, disengagement is prevented in the direction opposite the direction in which the guide shaft is inserted.

Preferably, a reciprocating mechanism of a spinning reel according to the present invention is the spinning reel reciprocating mechanism wherein the reel unit further includes a positioning projection, and the guide shaft comes into contact with the positioning projection when the guide shaft is inserted from the rear of the reel unit, such that an insertion direction position of the guide shaft is determined. In other words, the guide shaft is inserted from the rear of the reel unit, and a fore end thereof comes into contact with a positioning boss provided in the reel unit, whereby the guide shaft is positioned along the insertion direction. In this case, since the positioning boss prevents disengagement in the insertion direction, the guide shaft is more easily retained.

Preferably, a reciprocating mechanism according to the present invention is the spinning reel reciprocating mechanism wherein: the guide shaft has an interlocking portion formed at a rear end portion thereof along the insertion direction, for interlocking the guide shaft with one of the support portions that is at rearmost end in the insertion direction. By interlocking of the interlocking portion into the support portion, the guide shaft is positioned along the insertion direction. In this case, the position-restricting portion prevents disengagement in the direction opposite the direction in which the shaft is inserted, and the interlocking portion prevents disengagement in the insertion direction.

Preferably, reciprocating mechanism of a spinning reel according to the present invention is the spinning reel reciprocating mechanism wherein the reel unit has a plurality of support portions that are formed thereon and aligned along an axial direction. The guide shaft is inserted, along the axial direction of the guide shaft, through said plurality of support portions such that an outer circumferential surface of the guide shaft is entirely circumferentially supported by the plurality of support portions. The position-restricting portion includes two annular grooves into which two snap rings are fittable, whereby disengagement is prevented in a direction in which the guide shaft is inserted and the opposite direction. In this case, portions of the guide shaft prevent it from disengaging in both direction, and therefore, the configuration is further simplified.

Preferably, a reciprocating mechanism of a spinning reel according to the present invention is the spinning reel reciprocating mechanism wherein the sliding means includes: a rotating member having a cam, for rotating, in cooperation with rotation of the handle, around an axis substantially parallel to the handle rotational axis; and a cam-engaging groove, provided on the sliding member, engaging the cam and extending in a direction intersecting the direction of the spool shaft. In this case, structure for retaining the guide shaft can be simplified in gear-down type reciprocating mechanisms.

Preferably, a reciprocating mechanism of a spinning reel according to the present invention is the mechanism wherein the shifting means includes: a worm shaft disposed substantially parallel to the spool shaft and intersecting spiral grooves that are formed on a surface of the worm shaft; an intermediate gear fixed to the worm shaft for transmitting rotation of the handle to the worm shaft; and an engaging member pivotably accommodated in the sliding member and engaging the worm shaft. In this case, structure for retaining the guide shaft can be simplified in traverse cam type reciprocating mechanisms.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Overall Configuration

Figure 1:
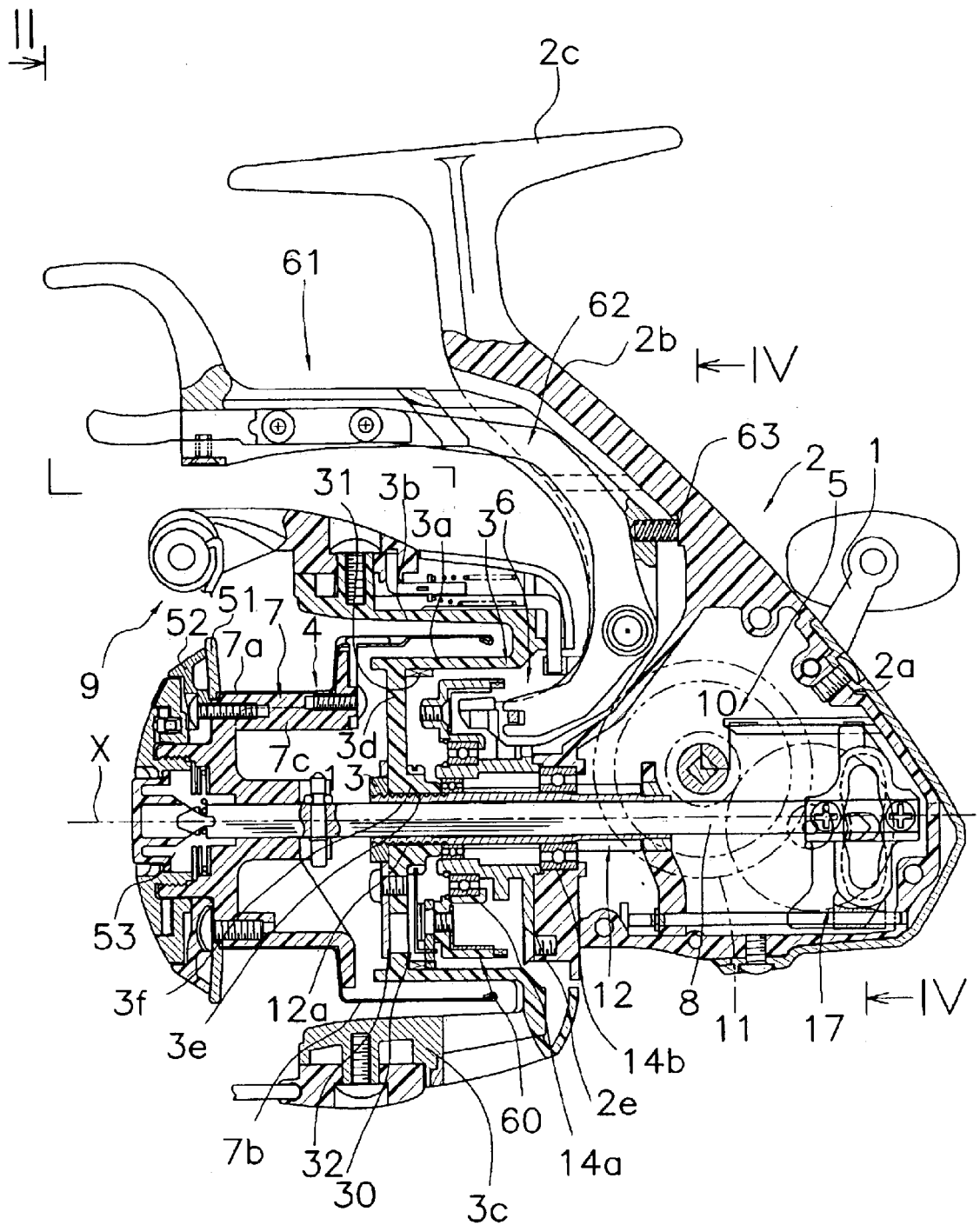
FIG. 1 is a side cross-sectional view of a spinning reel in accordance with one embodiment of the present invention.

A spinning reel in accordance with a first embodiment of the present invention, which is shown in FIG. 1, is a lever brake type reel that winds fishing line around a first axis X along the longitudinal direction of a fishing rod. The spinning reel includes a reel unit 2 provided with a handle 1, rotor 3 that is supported so as to be rotatable around the first axis X, and a spool 4 for winding fishing line and arranged in front of the rotor 3.

The reel unit 2 is made of, for example, a synthetic resin. The reel unit 2 has a mounting portion 2c extending front to rear for mounting a fishing rod, a reel body 2a arranged so as to have a clearance from the mounting portion 2c, and a leg portion 2b connecting the mounting portion 2c and the reel body 2a. The reel body 2a has a mechanism-fitting space in the interior thereof, and its side portion has an opening. This opening is covered by a lid member 2d (see FIGS. 2 and 4). On the front portion of the reel body 2a, a cylindrical mounting member 2e that has a mounting flange and is made of a metal is mounted.

The reel body 2a accommodates, in the interior thereof, a rotor drive mechanism 5 for rotating the rotor 3, a lever brake mechanism 6 for braking rotation of the rotor 3 in a line reel-out direction (reverse rotation), and an oscillating mechanism (an example of reciprocating mechanism) 17 for reciprocating the spool 4 back and forth with a spool shaft 8.

The rotor 3 is made of, for example, a synthetic resin or a metal and is rotatably supported on the reel unit 2. The rotor 3 has a cylindrical portion 3a, and a first arm portion 3b and a second arm portion 3c, both of which are provided at a side of the cylindrical portion 3a so as to oppose each other. The inner circumference surface of the cylindrical portion 3a that is on a front wall 3d side has a saw-toothed, reverse rotation-preventing bump 31, which is part of a pawl-type one-way clutch 30 for transmitting rotation of the rotor 3 in a line reel-out direction to the lever brake mechanism 6. At the center of the front wall 3d of the cylindrical portion 3a, a boss portion 3f having a through hole 3e is formed. A spool shaft 8 and a pinion gear 12, which is described later, pass through the through hole 3e. A bail arm 9 is provided pivotably on the fore end of the first arm portion 3b and the fore-end portion of the second arm portion 3c. This bail arm 9 guides the fishing line onto the spool 4.

The spool 4 is, for example, of a hybrid type made of a combination of a synthetic resin and a metal. The spool 4 is arranged between the first arm portion 3b and the second arm portion 3c of the rotor 3 and is mounted detachably and non-rotatably to the fore end of the spool shaft 8 with a one-touch attaching-and-detaching mechanism 53. The spool 4 has a spool body 7 having a bobbin trunk portion 7a, a large diameter front flange portion 51 attached onto the fore-end portion of the bobbin trunk portion 7a, and a front flange-securing member 52 for securing the front flange portion 51 to the spool body 7. The spool body 7 has the cylindrical bobbin trunk portion 7a onto the outer periphery of which fishing line is wound, a large diameter cylindrical skirt portion 7b integrally formed with the rear-end portion of the bobbin trunk portion 7a, and an internal cylinder member 7c attached on the inner peripheral side of the bobbin trunk portion 7a.

The bobbin trunk portion 7a and the skirt portion 7b are tubular, larger-smaller dual-stage components integrally formed by press-working with, for example, a thin sheet of aluminum alloy, titanium alloy, stainless alloy, magnesium alloy, or the like.

The rotor drive mechanism 5 has, as shown in FIG. 1, a master gear 11 that rotates with the handle shaft 10 onto which the handle 1 is fixed, and a pinion gear 12 that meshes with the master gear 11. The handle shaft 10 is rotatably supported on the reel unit 2. The pinion gear 12 is formed to have a cylindrical shape, and a front portion 12a thereof extends toward the spool 4 side, passing through the through hole 3e in the rotor 3. With this front portion 12a, the rotor 3 is non-rotatably secured to the pinion gear 12 by a nut 13. The pinion gear 12 is rotatably supported on the reel unit 2 at its front portion and mid-portion by bearings 14a and 14b. The bearing 14a for the front portion is attached onto the inner circumference surface of the mounting member 2e, which is a component of the reel unit 2. The nut 13 is locked by a retainer 32. The retainer 32 is fixed by a screw that is screw-fastened into a screw hole formed in the front wall 3d.

Figure 2:
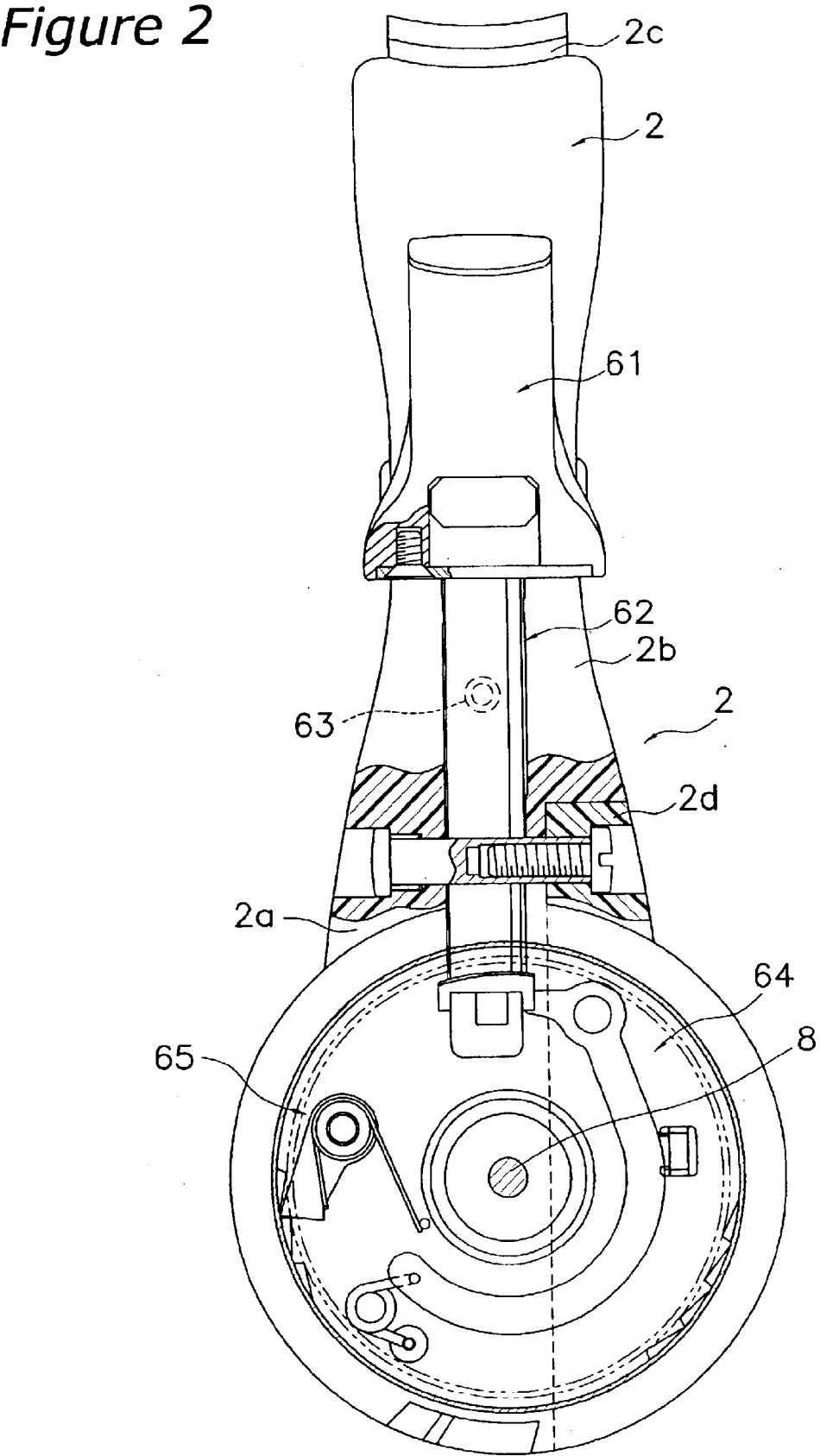
FIG. 2 is a cross-sectional view of the spinning reel in accordance with the embodiment of the present invention viewed along line II—II of FIG. 1.

The lever brake mechanism 6 has, as shown in FIG. 1 and FIG. 2, a brake portion 60 for braking rotation of the rotor 3 in a line reel-out direction, a brake lever 61 for adjusting and manipulating braking force of the brake portion 60, an auxiliary lever 62 for operating the brake portion 60 to be in a predetermined braking state, a coil spring 63 for urging the brake lever 61 in a direction in which it detaches from the mounting portion 2c, a brake portion 64 (see FIG. 2) that can be switched between a predetermined braking state and a predetermined brake releasing state by the auxiliary lever 62, and a sounding device 65 (see FIG. 2) that produces sound by reverse rotation of the rotor 3.

Configuration of Oscillating Mechanism

Figure 3:
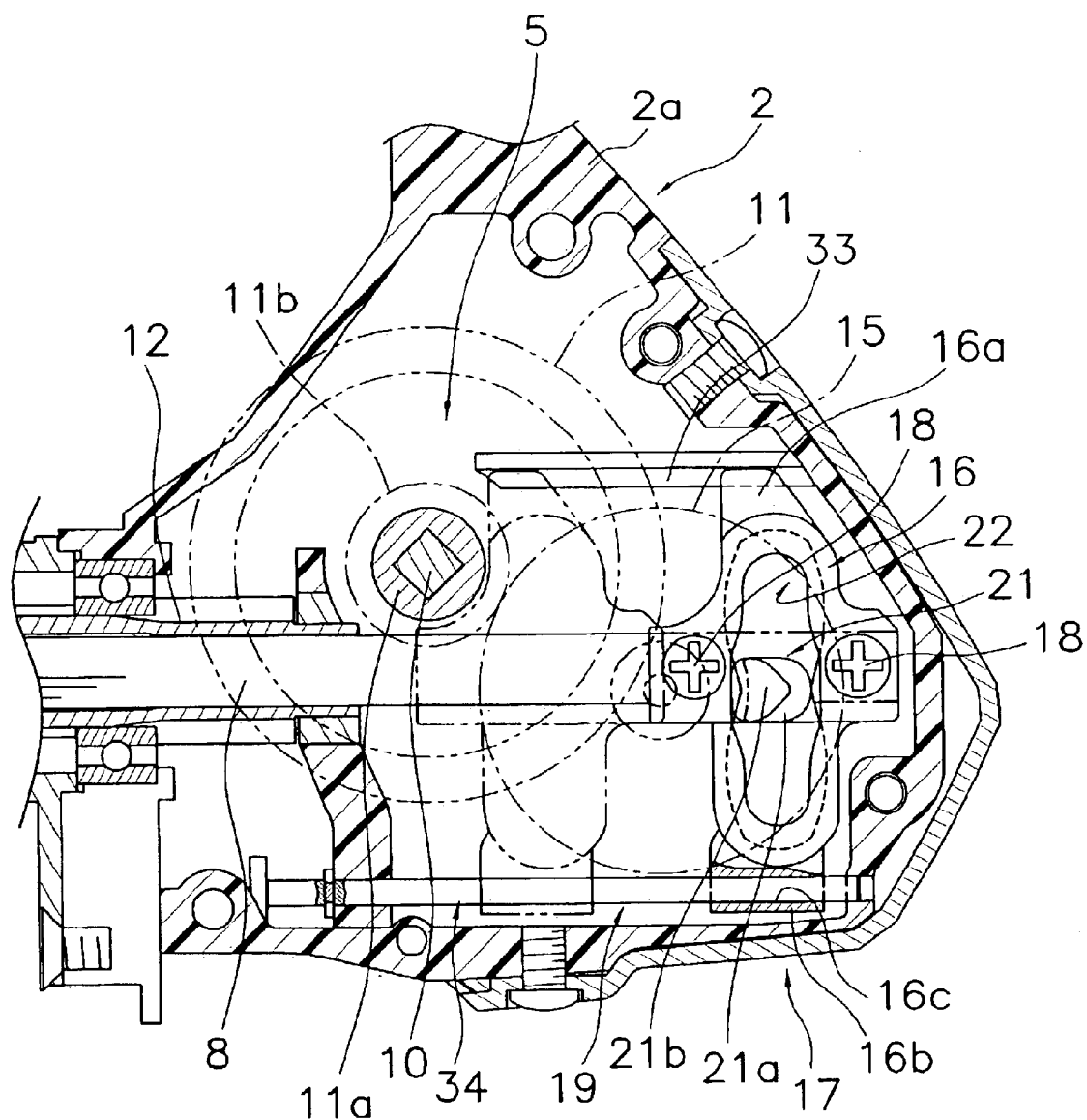
FIG. 3 is an enlarged cross-sectional view of the oscillating mechanism in accordance with the present invention.
Figure 4:
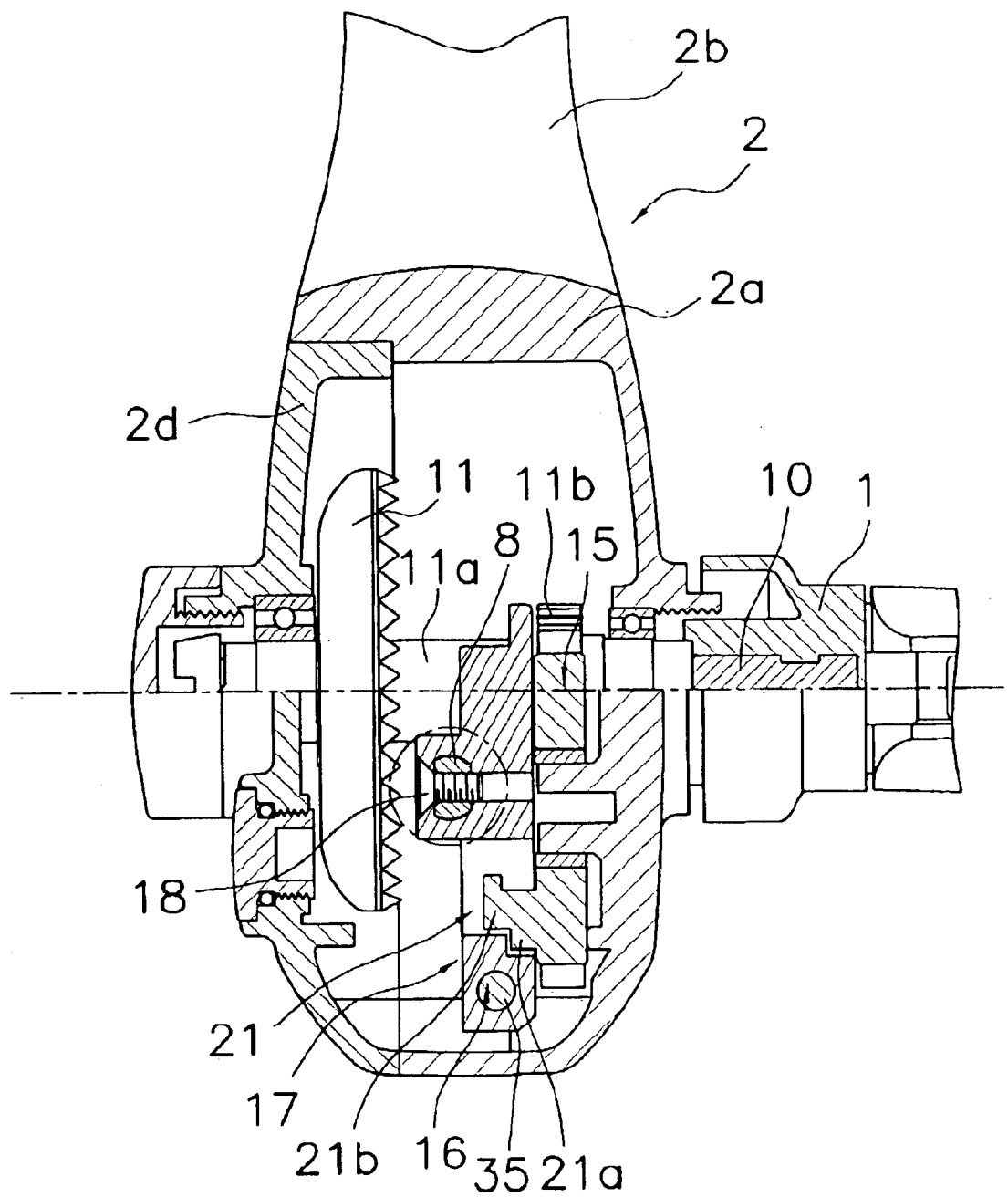
FIG. 4 is a cross-sectional view of the oscillating mechanism in accordance with the embodiment of the present invention taken along line IV—IV of FIG. 1.

The oscillating mechanism 17 is, as shown in FIGS. 3 and 4, a device that causes a spool shaft 8, which is secured to the spool 4 at its center, to move back and forth so that the spool 4 moves in the same direction. The oscillating mechanism 17 is of gear-down type and has a gear member 15 that rotates in cooperation with the master gear 11, a slider member 16 that reciprocates in a spool shaft direction in cooperation with rotation of the gear member 15, and a guide 19 that guides the slider member 16 in a direction parallel to the spool shaft.

The gear member 15 is mounted on a wall surface of the reel body 2a so as to be rotatable around an axis substantially parallel to the handle shaft 10. The gear member 15 meshes with a drive gear 11b formed on a shaft portion 11a of the master gear 11. A portion of the peripheral rim of the gear member 15 that is on a side face thereof opposing the slider member 16 is provided with a cam 21 having a first cam portion 21a and a second cam portion 21b protruding toward the slider member 16.

As shown in FIGS. 3, 4, 6, and 7, the first cam portion 21a protrudes toward the slider member 16 from a side face of the gear member 15 and is located radially more outward than the second cam portion 21b. The second cam portion 21b has substantially the same width as that of the first cam portion 21a, and a slightly shorter radial length than that of the first cam portion 21a. The second cam portion 21b protrudes further toward the slider member 16 than the first cam portion 21a. A diametrically outside engaging surface 24a of the first cam portion 21a has a semicircular shape while an inner engaging surface 24b has a concaved circular surface that is larger in diameter than that of the engaging surface 24a. A diametrically outside engaging surface 25a of the second cam portion 21b has a triangular shape having a rounded fore end, while an inside engaging surface 25b has a linear shape. Both of the ends of the inside engaging surface 25b are slightly rounded. The second cam portion 21b protrudes further from the first cam portion 21a toward the slider member 16 in a step-wise manner. Both cam portions 21a and 21b are formed at the same circumferential position on the gear member 15.

The slider member 16 is supported by the guide 19 so that it can reciprocate in an axial direction parallel to the spool shaft 8. The slider member 16 is secured to the rear end of the spool shaft 8 non-rotatably and axially immovably by two flat head screws 18.

Figure 5:
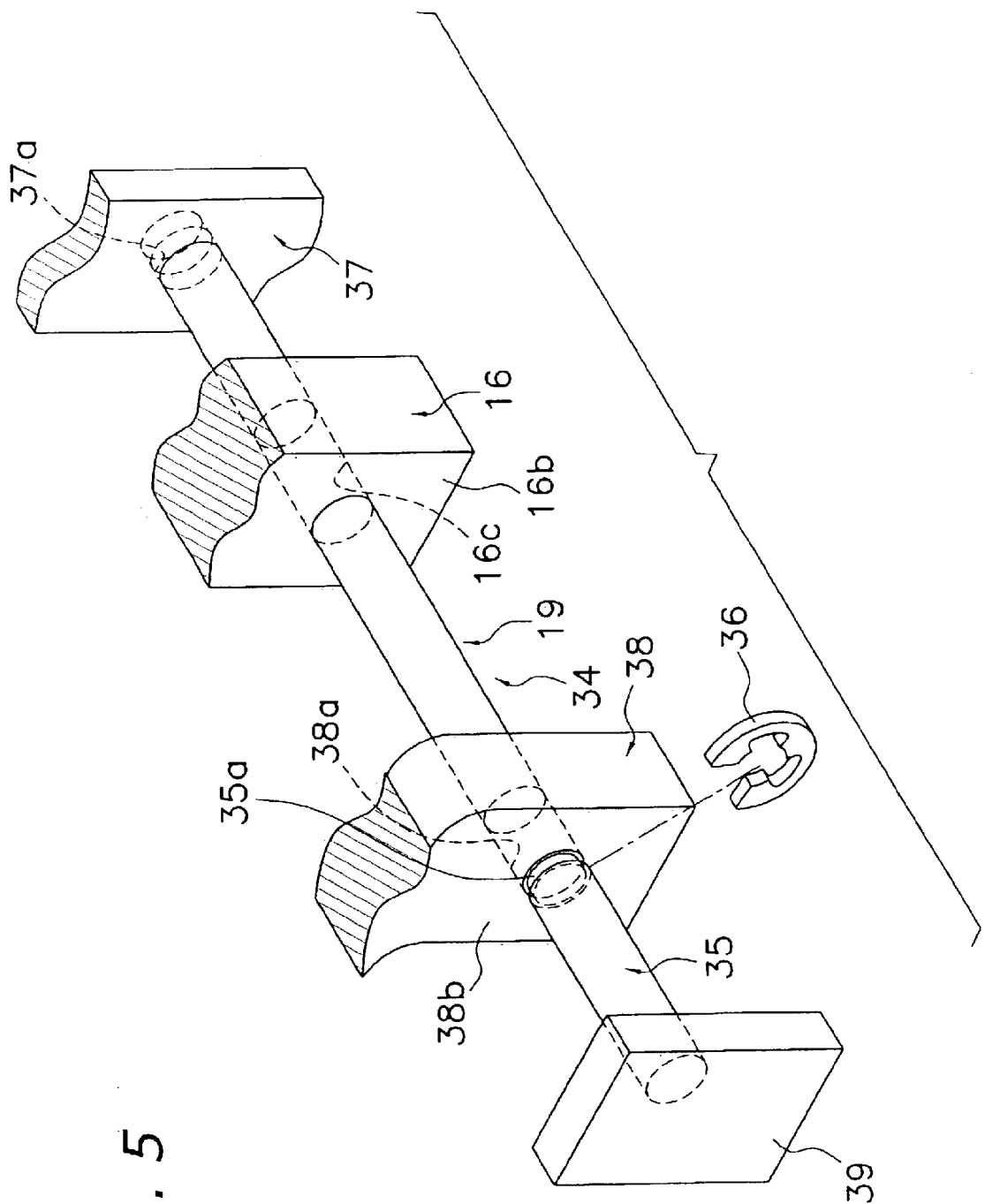
FIG. 5 is a schematic perspective view showing a mounting structure of the guide shaft in accordance with the embodiment of the present invention.
Figure 6:
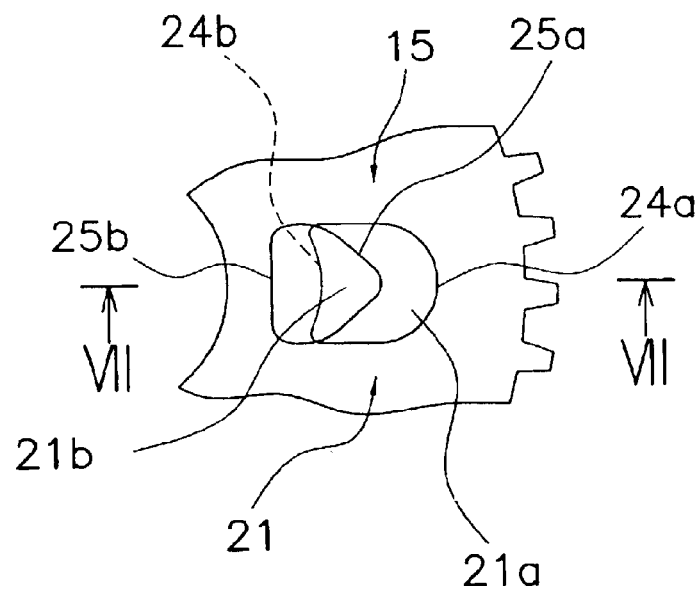
FIG. 6 is a front view of the first and the second cam portions in accordance with the embodiment of the present invention.

The guide 19 has, as shown in FIGS. 3 and 5, a first guide portion 33 formed on an upper portion of the reel body 2a and a second guide portion 34 arranged at the bottom of the reel body 2a.

The first guide portion 33 is formed on an upper inner wall of the reel body 2a so as to protrude toward the lid member 2d side and contacts slidingly with a guiding piece 16a so that the slider member 16 is guided in the spool shaft direction.

The second guide portion 34 has a guide shaft 35 arranged parallel to the spool shaft 8. The guide shaft 35 is supported at two locations of its outer circumferential surface, which are a rear wall portion 37 and a mid wall portion 38 of the reel body 2a.

The rear wall portion 37 and the mid wall portion 38 have through holes 37a and 38a (examples of support portion) formed therein for the guide shaft 35 to pass through. The guide shaft 35 is inserted from the through hole 37a. The guide shaft 35 passes through a through hole 16c formed in a guide piece 16b of the slider member 16 that protrudes downward, and further through a through hole 38a, so as to be mounted onto the reel body 2a. Specifically, the guide shaft 35 is mounted into the interior of the reel body 2a from the rear.

The outer circumferential surface of the guide shaft 35 that faces a front side wall surface 38b of the mid wall portion 38 (which is a surface on a far side from where the guide shaft is inserted) has an annular groove 35a formed thereon, which serve as a position restricting portion. On the annular groove 35a, an E-shaped snap ring 36 is attached, by which the guide shaft 35 is prevented from disengaging. The fore end of the guide shaft 35 is prevented from detaching by making contact with a fore-end wall portion 39 (an example of the positioning projection) formed in front of the mid wall portion 38 of the reel body 2a. In other words, the fore-end wall portion 39 prevents the guide shaft 35 from disengaging in an insertion direction, and the E-shaped snap ring 36 prevents it from disengaging in a direction opposite to the insertion direction by making contact with the front side wall surface 38b of the mid wall portion 38.

When the retaining structure of this kind is employed, the guide shaft 35 can be prevented from disengaging with the E-shaped snap ring 36 attached to the annular groove 35a. Therefore, it is no longer necessary to use complicated structures such as a retainer member fixed by a screw to prevent disengagement. Thus, retaining structure for the guide shaft 35 can be simplified. Moreover, since the need for attaching a retainer member at the rear of the reel unit 2 is eliminated, the space for mounting the retainer member becomes unnecessary, reducing constraints in designing the reel unit 2.

Figure 7:
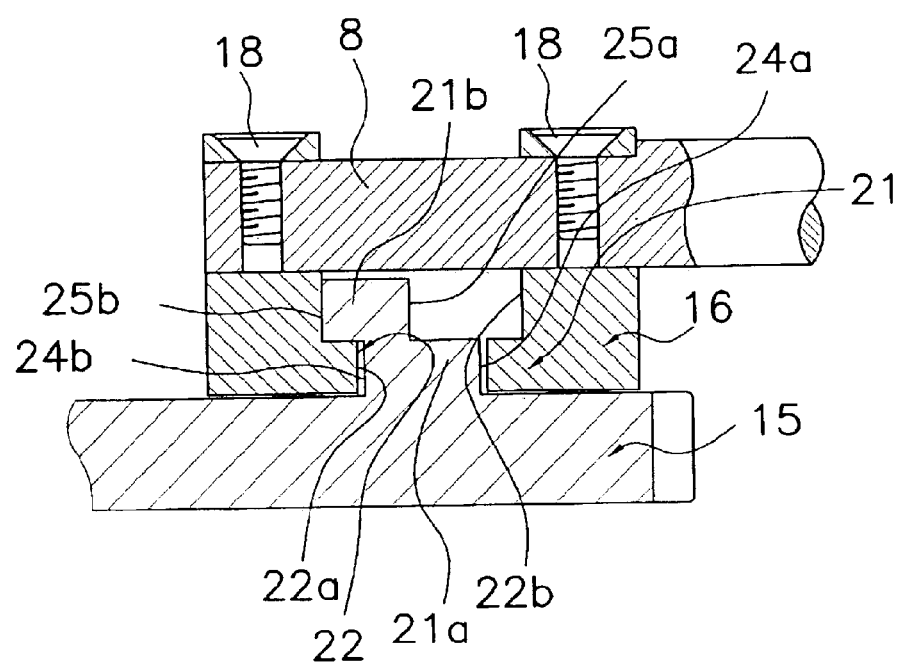
FIG. 7 is a cross-sectional view of the first and the second cam portions in accordance with the embodiment of the present invention viewed along line VI—VI of FIG. 6.

As shown in FIG. 7, a first cam-engaging slot 22a and a second cam-engaging slot 22b, which respectively engage the first cam portion 21a and the second cam portion 21b of the gear member 15, are formed on a side face of the slider member 16 that opposes the gear member 15. Engagement of the first cam portion 21a and the first cam-engaging slot 22a and engagement of the second cam portion 21b and the second cam-engaging slot 22b realizes a high-speed cam and a slow speed cam, respectively.

A cam-engaging groove 22, which is a through-bore, is formed in the slider member 16 along an axial direction which is parallel to the rotation shaft axis of the gear member 15. The flat head screws 18 are screwed from the lid member 2d side, which is on the left hand side in FIG. 4, into the spool shaft 8. The flat head screws 18 are disposed at both sides of the slider member 16 sandwiching the bored-through cam-engaging groove 22.

Because the slider member 16 is thus fixed to the spool shaft 8 at two locations, even though the cam-engaging groove 22 is bored therethrough, the slider member 16 is reinforced by the spool shaft 8 and the relative strength of the slider member 16 is maintained high. Therefore, the cam-engaging groove 22 is not easily deformed even when pressed by the cam 21. For this reason, even when the bored-through cam-engaging groove 22 is provided in the slider member 16, it is possible to suppress reduction in transmission efficiency from the gear member 15 to the slider member 16.

Figure 8:
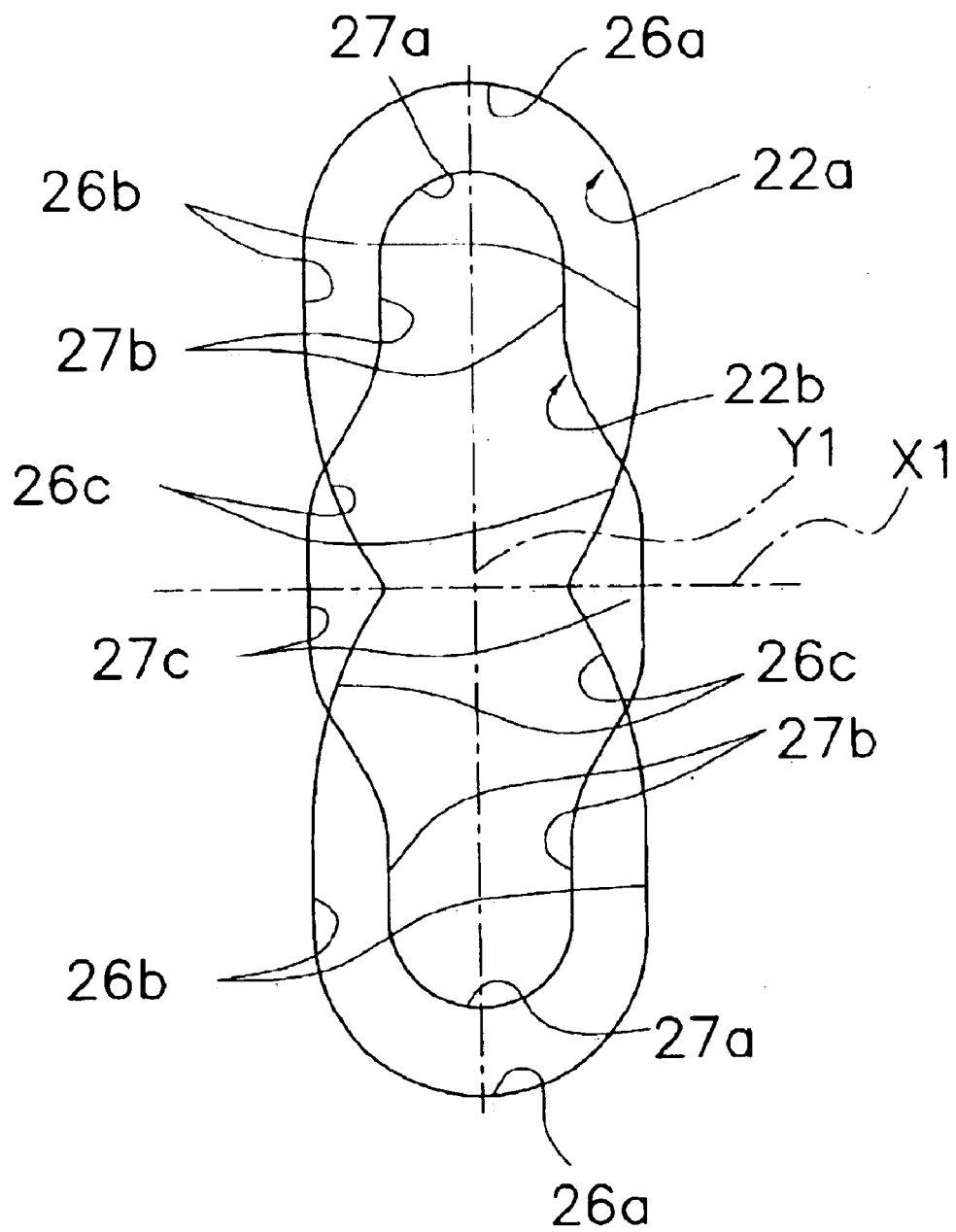
FIG. 8 is a view illustrating the shapes of the first and second cam-engaging slots in accordance with the embodiment of the present invention.

Both slots 22a and 22b extends, as shown in FIG. 8, in a first axis Y1 direction orthogonal to the shaft axis X of the spool shaft 8; the slots have symmetrical shapes with respect to the first axis Y1 and are formed to align in the direction in which the first and the second cam portions 21a and 21b protrude. Both slots 22a and 22b also have symmetrical shapes with respect to a second axis X1, which is orthogonal to the first axis Y1 and passing through the rotation shaft axis of the gear member 15. The first cam engaging slot 22a has a length greater than that of the second cam-engaging slot 22b along the direction orthogonal to the spool shaft 8 because the first cam engaging slot 22a needs to engage with the first cam portion 21a.

The first cam-engaging slot 22a includes first semicircular portions 26a formed at both ends of the axis orthogonal to the spool shaft 8, first opposing portions 26b formed so as to be concaved slightly outwardly from the first semicircular portions 26a toward the second axis, and first inclined portions 26c formed so as to incline and be concaved slightly outwardly such that the gap narrows gradually from the first opposing portions 26b toward the center of the slot 22a. Among these, the first semicircular portions 26a and the first opposing portions 26b should be such shapes that the first cam portion 21a does not engage therewith. More specifically, the first semicircular portions 26a and the first opposing portions 26b do not necessarily need to be semicircular shapes or slightly concaved shapes. The first semicircular portions 26a and the first opposing portions 26b may be in any other shapes. The portions from the boundary between the first opposing portions 26b and the first inclined portions 26c toward the first inclined portions 26c engage with the first cam portion 21a, and the shape thereof is an important factor regarding traveling speed of the slider member 16.

The second cam-engaging slot 22b includes: second semicircular portions 27a formed at both ends of the axis intersecting the spool shaft 8 so as to have a smaller diameter than the first semicircular portion 26a; second opposing portions 27b formed parallel to each other from the second semicircular portion 27a and extending toward the second axis X1; and second inclined portions 27c formed parallel to each other and orthogonally intersecting the second axis X1 at both sides of the second axis X1 so as to be inclined so that the gap gradually widens from the second opposing portions 27b toward the second axis X1 and that the gap is wider than that between the first inclined portions 26c. The second inclined portions 27c have such shapes that the engaging surface 25b of the second cam portion 21b can always engage therewith when the engaging surface 24a of the first cam portion 21a is engaged with the first cam-engaging slot 22a.

The gap between the second opposing portions 27b is substantially equal to or slightly larger than the width of the second cam portion 21b. The gap of one of the first inclined portions 26c at one side and one of the second incline portions 27c at the other side is, at its center (on the second axis X1), substantially equal to or slightly larger than the length from engaging surface 24a of the first cam portion 21a to the engaging surface 25b of the second cam portion 21b. The engagement of the first cam portion 21a and the first cam-engaging slot 22a switches over to the engagement of the second cam portion 21b and the second cam-engaging slot 22b, so that rotational motion of the gear member 15 is converted to reciprocating linear motion of the slider member 16; consequently, the spool 4 reciprocates in the spool shaft axis X.

Here, the proportion of conversion from rotational motion to reciprocating motion in the high-speed cam resulting from engagement of the first cam-engaging slot 22a and the first cam portion 21a that is positioned radially outwardly is greater than that in the slow speed cam resulting from engagement of the second cam portion 21b and the second cam-engaging slot 22b. For this reason, the rotational motion can be converted into a motion close to uniform linear motion by switching between the two types of cams as follows; engagement with the high-speed cam takes place at rotational positions 45 degrees forward and backward from both ends of the slider member 16's traveling range, in which traveling speed of the slider member 16 is slow, whereas engagement with the slow speed cam takes place at rotational positions 45 degrees forward and backward in the mid range, in which the traveling speed is high. In addition, when engagement with the first cam portion 21a takes place, by the provision of the first inclined portions 26c where the gap therebetween narrows the traveling distance is increased as the slider moves toward both ends of the traveling range so that uniform linear motion can be maintained.

Reel Handing and Operation

When casting, the bail arm 9 is flipped over to a line-releasing posture while fishing line is being hooked with the index finger.

When retrieving fishing line, the bail arm 9 is flipped over to a line-retrieving posture. Under this condition, when the handle 1 is rotated in the line reel-in direction, the torque is transmitted through the handle shaft 10 and the master gear 11 to the pinion gear 12. The torque transmitted to the pinion gear 12 is then transmitted to the rotor 3 via the front portion 12a of the pinion gear 12.

Meanwhile, accompanied by rotation of the master gear 11, the gear member 15 of the oscillating mechanism 17 that meshes with the drive gear 11b rotates. Accordingly, the rotation is transmitted to the slider member 16 by either one of the cam portion 21a or 21b. As a result, the slider member 16 reciprocates along the axial direction X of the spool shaft 8.

In this situation, as shown in FIG. 9(a), when the slider member 16 has returned from a forward position to a mid position, the first and the second cam portions 21a and 21b are located in an upper position and the spool is located at a mid position. Under this condition, the first cam portion 21a is at the top point (central position) of one of the first semicircular portions 26a of the first cam-engaging slot 22a. In this state, traveling distance L is 0, where traveling distance L is a traveling distance from the center of the gear member 15 to the slider member 16 along the fore and aft axis.

Figure 9:
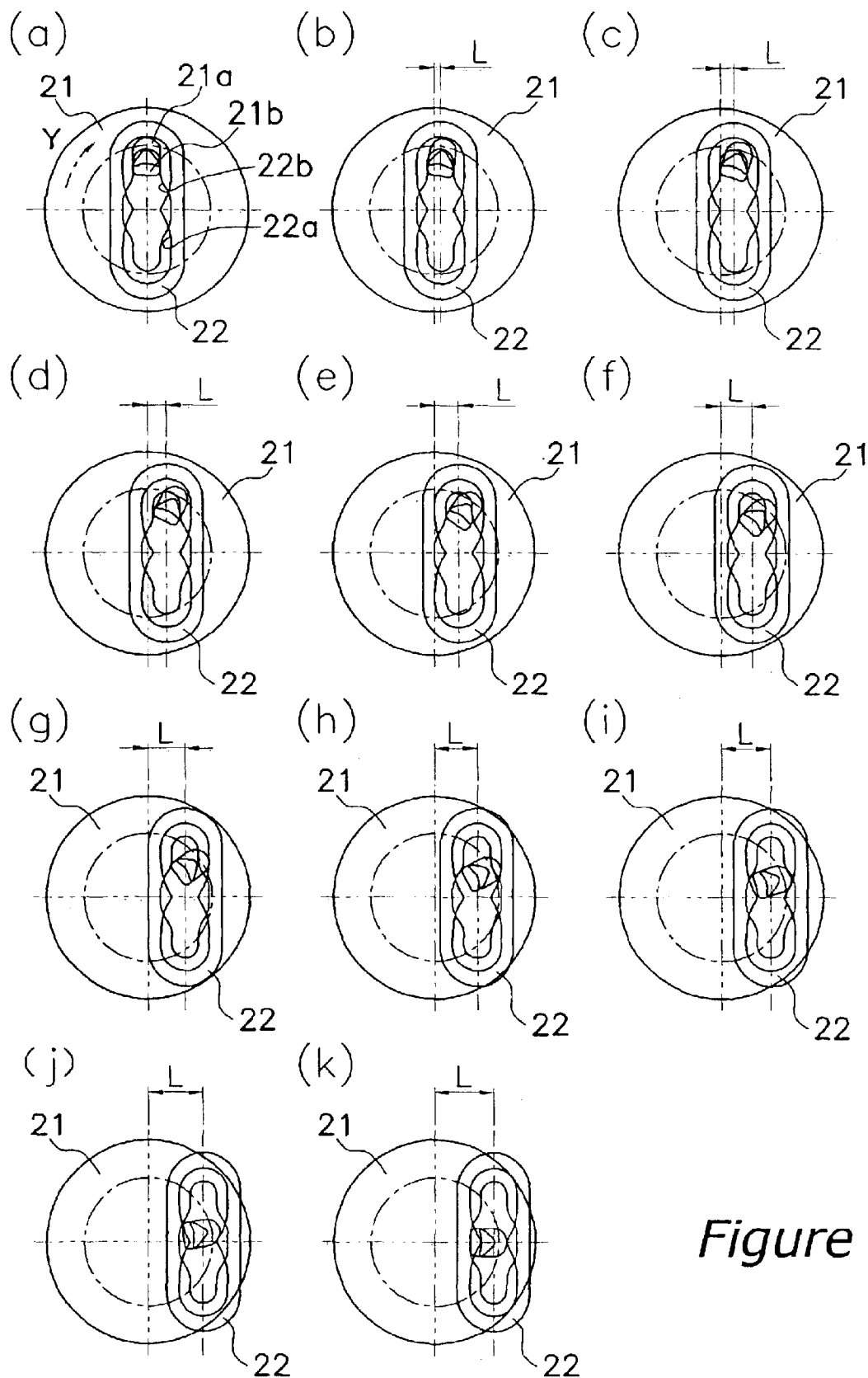
FIG. 9 is a schematic view showing the positional relationship between the slider member and the gear member of the oscillating mechanism in accordance with the embodiment of the present invention.

Under this condition, when the handle 1 is rotated in the line reel-in direction, the gear member 15 rotates clockwise of FIG. 9, as indicated by arrow Y. FIG. 9 depicts change in engagement state at every 9 degrees rotation, until the gear member 15 rotates 90 degrees. Here, until the gear rotates to a 45-degree rotational position shown in FIG. 9(f), the second cam portion 21b engages with the second cam-engaging slot 22b so as to reduce the traveling speed relative to rotation. Specifically, when the gear member 15 starts to rotate from the position shown in FIG. 9(a), at which the slider member 16 is at the mid position in its traveling range, the first cam portion 21a gradually disengages from the first cam-engaging slot 22a; then, the second cam portion 21b becomes engaged with the second cam-engaging slot 22b, and using the slow speed cam, the engaging surface 25a of the second cam portion 21b presses the second cam-engaging slot 22b, thus gradually moving the slider member 16 backwards.

Then, when the gear rotates to a 45-degree rotational position shown in FIG. 9(f), the first cam portion 21a becomes engaged with the first opposing portion 26b of the first cam-engaging slot 22a, and using the high-speed cam resulting from the engagement of the first cam portion 21a and the first cam-engaging slot 22a, the first cam portion 21a presses the slider member 16 to move. Specifically, at the 45-degree rotational position shown in FIG. 9(f), switching from the slow speed cam to the high-speed cam takes place. Then, the engaging surface 24a of the first cam portion 21a engages with the first inclined portion 26c of the first cam-engaging slot 22a, pressing the slider member 16. This first inclined portion 26c has an inclined surface so that the gap gradually narrows, and therefore has a function of maintaining the traveling speed at a uniform speed relative to rotation of the gear member 15. Thus, uniform linear motion is maintained to the rear end of the traveling range. When reaching the rear end position shown in FIG. 9(k), the engaging surface 24a of the first cam portion 21a comes into contact with the first cam-engaging slot 22a and also the engaging surface 25b of the second cam portion 21b comes into contact with the second cam-engaging slot 22b. It should be noted that during these movements, the engaging surface 25b of the second cam portion 21b is in contact with the second cam-engaging slot 22b at all times. This reduces chattering of the slider member 16 when it travels.

Figure 10:
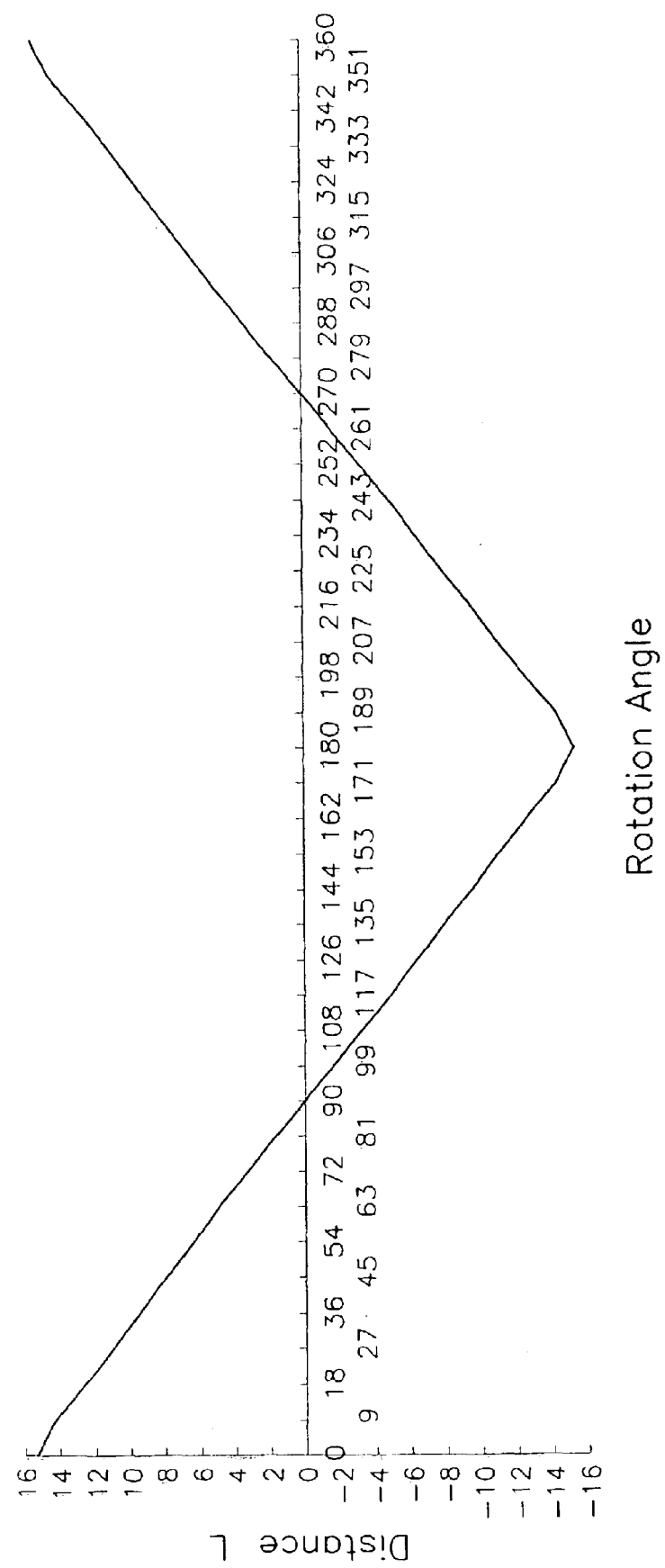
FIG. 10 is a graph showing the relationship between rotation positions of the gear member and traveling distance of the slider member.

FIG. 10 shows change in traveling positions of the slider member 16 when the gear rotates one revolution. In FIG. 10, the vertical axis represents traveling distances L of the slider member 16 from the mid position, while the horizontal axis represents rotational positions of the gear member 15 from the rearmost position. For convenience, the traveling stroke of the spool here is set to be 15 mm. The rotational positions in a range of from 270 degrees to 360 degrees shown in FIG. 10 represent the traveling speeds of the slider member 16 when it travels as shown in FIG. 9. In the conventional gear-down type oscillating mechanism using engagement pin, this graph produces a cosine curve, but in the present embodiment, the graph is almost a linear function. Therefore, the contour of wound line can be improved to a near flat shape.

When the slider member 16 reaches the rear end position in the traveling range, the engaging surface 25b of the second cam portion 21b comes into contact with the inclined surface 27c of the second cam-engaging slot 22b, pressing the slider member 16 to move forward. At this moment, the engaging surface 24a of the first cam portion 21a is engaged with the first cam-engaging slot 22a. Therefore, until the process returns from FIG. 9(k) to Figure (f), the first cam portion 21a engages with the first cam-engaging slot 22a, moving the slider member 16 using the high-speed cam relative to rotation. Then, when reaching the mid position between FIG. 9(f) and FIG. 9(a), the slow speed cam, constituted by the second cam portion 21b and the second cam-engaging slot 22b, is used to move the slider member 16.

Herein, the slow speed cam is employed in an angular range of 45 degrees forward and rearward from the mid position, while the high-speed cam is employed in a range outside thereof toward either end, and moreover, when employing the high speed cam, the first inclined portion 26c of the first cam-engaging slot 22a is used to maintain uniform linear motion. As a result, a state near uniform linear motion is achieved as a whole. For this reason, the contour of wound line can be improved with a simple configuration using no excess components, while reducing transmission loss.

In addition, since the slider member 16 is fixed to the spool shaft 8 at two locations with the flat head screws 18 sandwiching the cam engaging groove 22, the slider member 16 is reinforced by the spool shaft 8 so that its relative strength can be maintained high. Accordingly, the cam engaging groove 22 does not easily deform even when pressed by the cam 21. For this reason, reduction in transmission efficiency from the gear member 15 to the slider member 16 can be reduced even when the bored-through cam engaging groove 22 is provided in the slider member 16.

Furthermore, because of the guide shaft 35, which guides the slider member 16, chattering of the slider member 16 is reduced and the slider member 16 is smoothly guided. In addition, the guide shaft 35 is prevented from disengaging in a direction opposite to the insertion direction with the E-shaped snap ring 36 attached to the annular groove 35a. Therefore, it is unnecessary to use complicated structures such as retainer members fixed by screws for preventing disengagement. Thus, retaining structure for the guide shaft can be simplified. Further, it is unnecessary to mount a retainer member at the rear of a reel unit, eliminating the need for providing the mounting space therefor, which reduces constraints in designing a reel unit.

Figure 11:
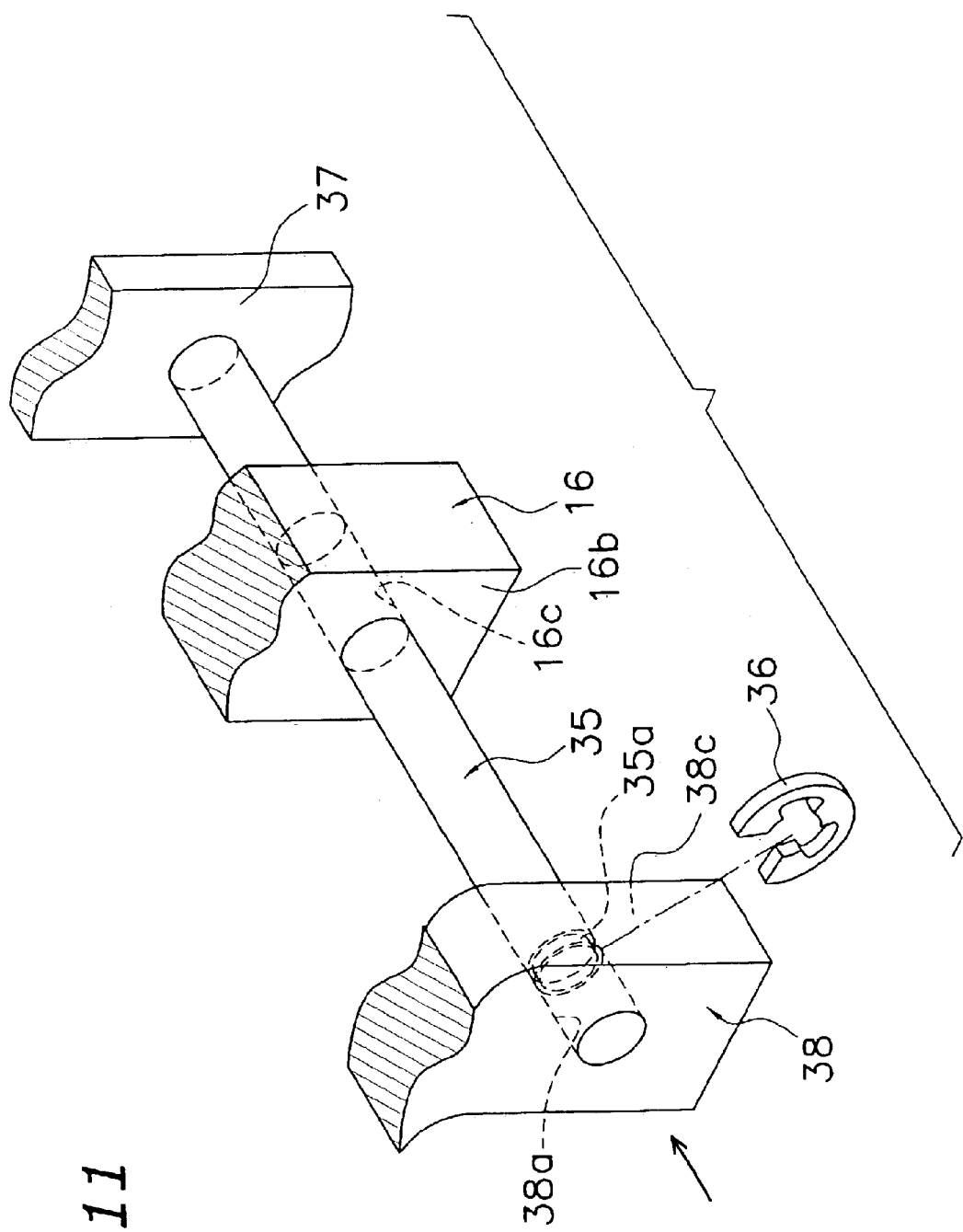
FIG. 11 is a schematic perspective view corresponding to FIG. 5, showing a mounting structure of the guide shaft in accordance with another embodiment of the present invention.

Other Embodiments (a) The foregoing embodiment describes an example in which the guide shaft 35 is mounted from the rear, but the present invention may be applied to cases in which the guide shaft 35 is inserted from the front of the reel. For example, as shown in FIG. 11, it is possible to support the outer circumferential surface of the guide shaft 35 by the through hole 38a that is formed in the mid wall portion 38 and a supporting hole 37c that is formed in the rear wall portion 37 and does not bore therethrough. At the same time, it is possible to prevent the guide shaft 35 from disengaging in the insertion direction by the bottom of the supporting hole 37c. In this case, the annular groove 35a is formed on the outer circumferential surface facing a rear side wall surface 38c of the mid wall portion 38 (a side opposite from where it is inserted). The annular groove 35a is fitted with the E-shaped snap ring, by which disengagement of the guide shaft 35 in a direction opposite to the insertion direction is prevented.

Figure 12:
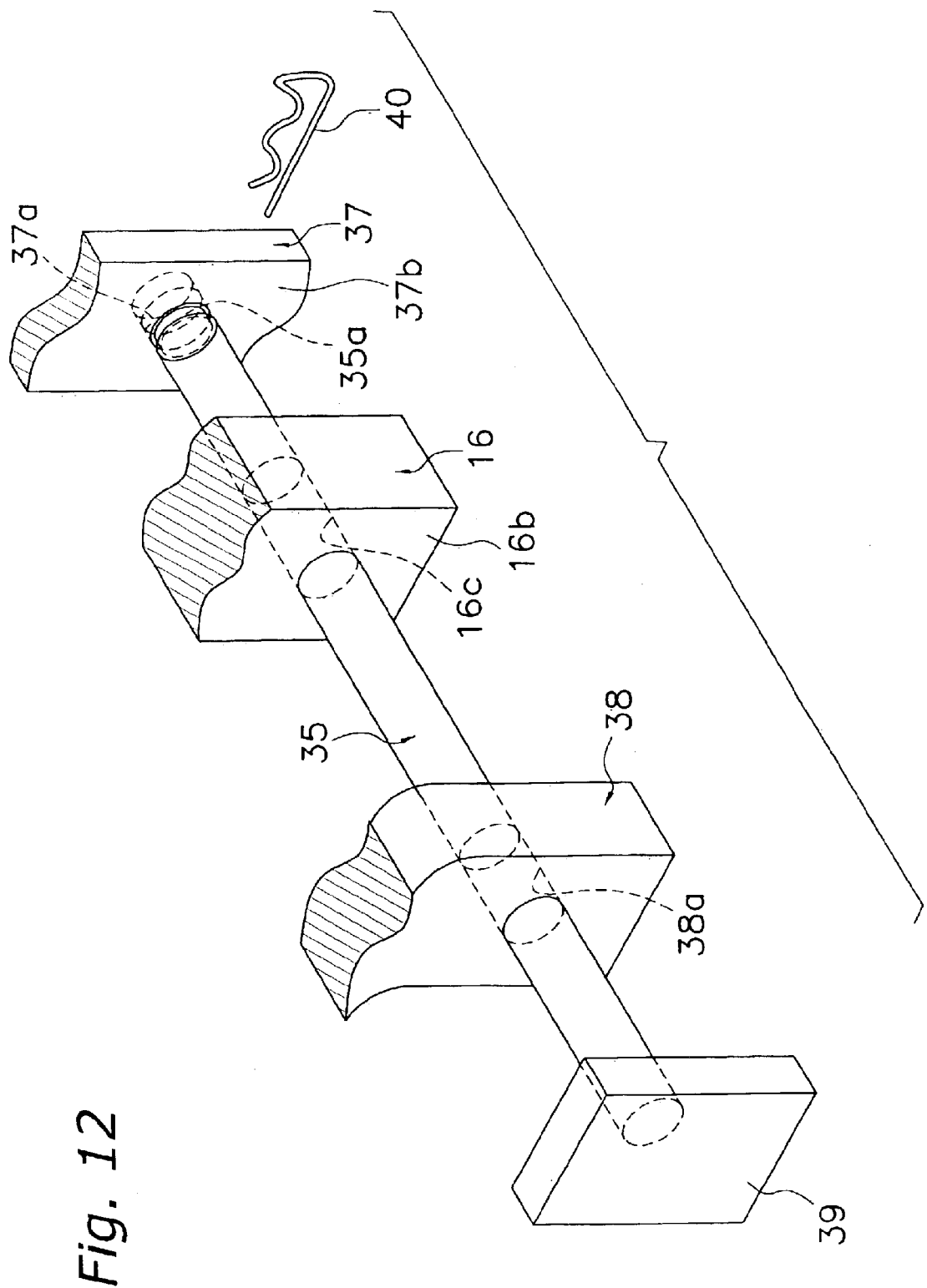
FIG. 12 is a schematic perspective view corresponding to FIG. 5, showing a mounting structure of the guide shaft in accordance with still another embodiment of the present invention.

(b) In the foregoing embodiment, the E-shaped snap ring is employed as a retainer member. However, the retainer member may be other kinds of retaining rings, such as a C-shaped snap ring, insofar as they can be fitted into the annular groove. Moreover, as shown in FIG. 12, a retaining spring 40 may be used that is formed by bending a metal wire into a hairpin shape. In the embodiment shown in FIG. 12, the annular groove 35a is formed on the outer circumferential surface that faces a front side wall surface 37b of the rear wall portion 37 (a side opposite from where it is inserted). Thus, the location of the annular groove 35a may be any locations insofar the location faces a surface of a support portion supporting the guide shaft 35 that is opposite to where it is inserted.

(c) In the foregoing embodiment, the position-restricting portion was made up of the annular groove, but it may be configured by, for example, a regulating hole radially passing through the guide shaft. In this case, disengagement may be prevented by inserting, for example, a split pin into the regulating hole.

Figure 13:
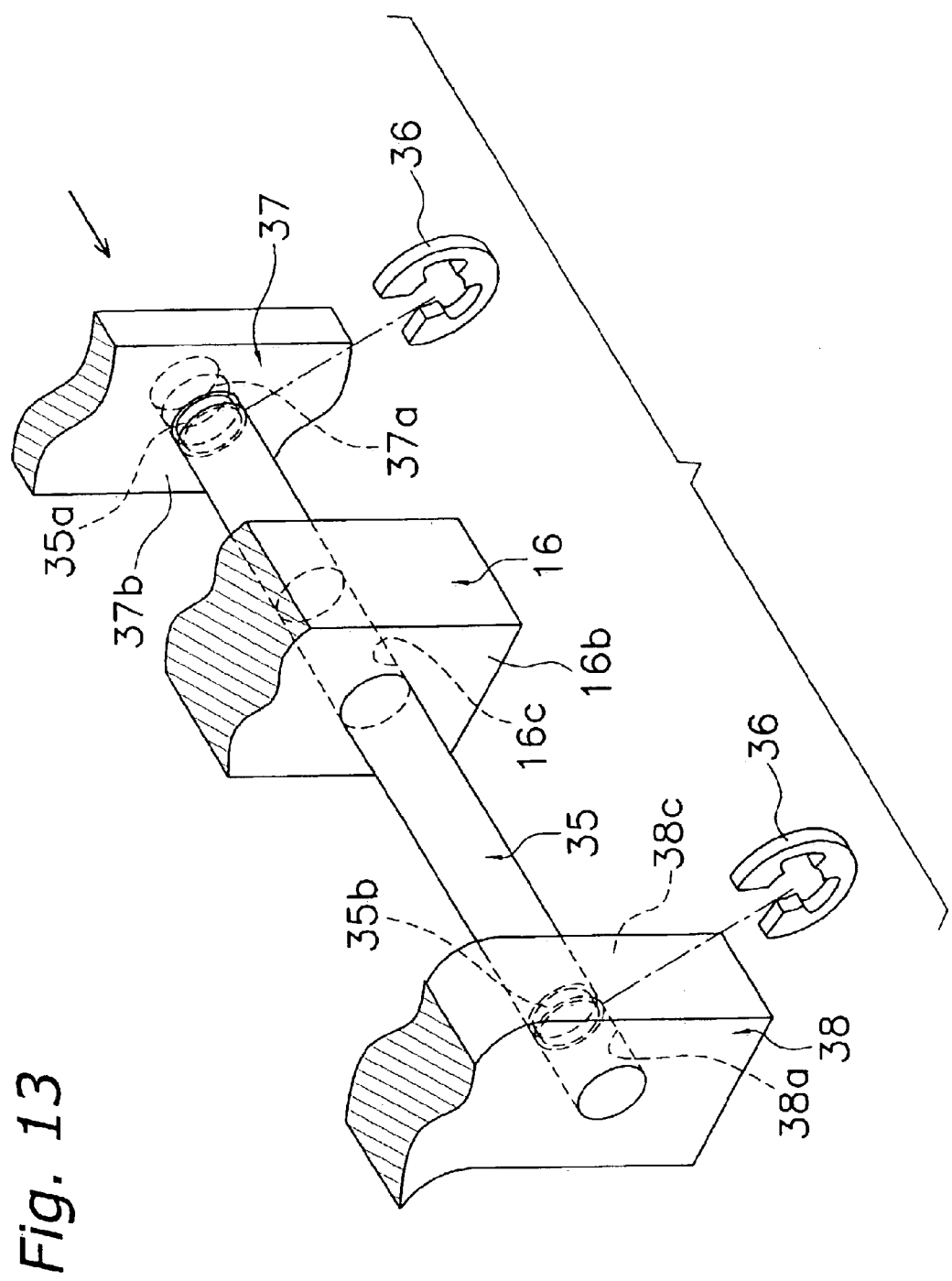
FIG. 13 is a schematic perspective view corresponding to FIG. 5, showing a mounting structure of the guide shaft in accordance with still another embodiment of the present invention.

(d) In the foregoing embodiment, disengagement is prevented by the retainer member in only a direction opposite to where the shaft is inserted, but it is possible to prevent disengagement in both directions by the position-restricting portion. For example, as shown in FIG. 13, annular grooves 35a and 35b may be formed on an outer circumferential surface facing the front side wall surface 37b of the rear wall portion 37 and a circumferential surface facing the rear side wall surface 38c of the mid wall portion, and E-shaped snap rings 36 may be fitted into the annular groove 35a and 35b. In this case, it becomes unnecessary to provide a structure for retaining in the reel body 2a.

(e) In the foregoing embodiment, a gear-down type oscillating mechanism is illustrated as an example, but the present invention may be applied to traverse cam type oscillating mechanisms.

Figure 14:
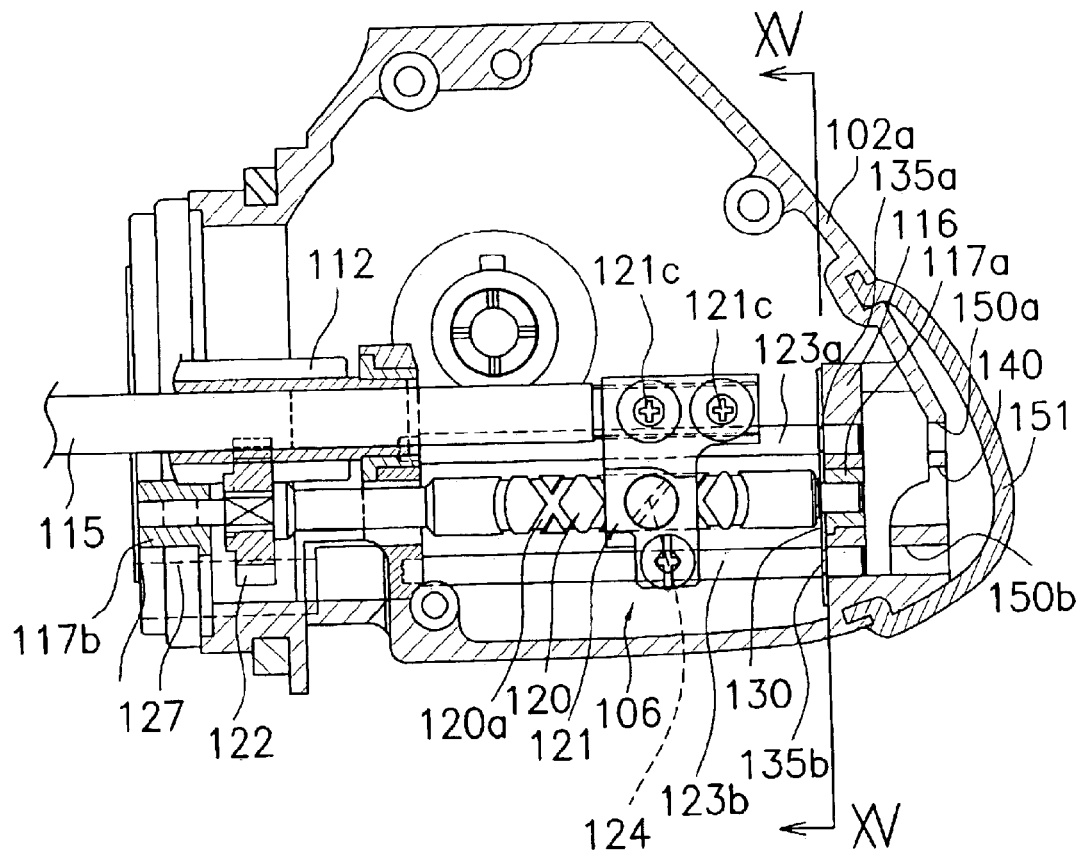
FIG. 14 is a partial cross-sectional view of a traverse cam type oscillating mechanism in accordance with still another embodiment of the present invention.
Figure 15:
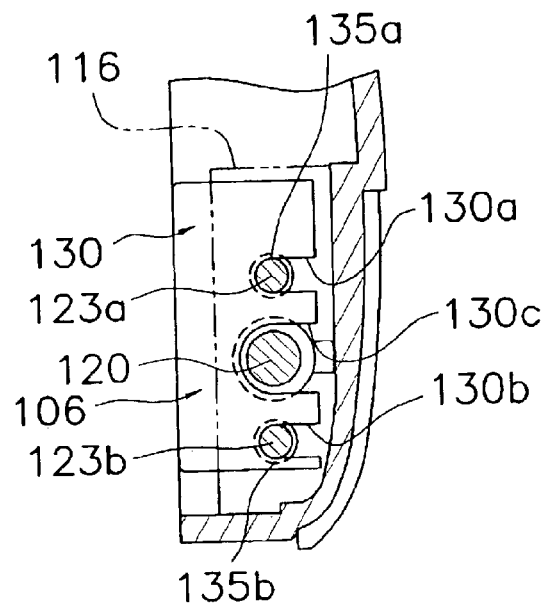
FIG. 15 is a cross-sectional view of the traverse cam type oscillating mechanism in accordance with the embodiment of FIG. 14, viewed along line XV—XV of FIG. 14.

Referring to FIGS. 14 and 15, an oscillating mechanism 106 is a mechanism for reciprocating in a forward and backward directions a spool shaft 115 connected to a spool (not shown) at its center through a drag mechanism (not shown) to reciprocates the spool in the same direction. The oscillating mechanism 106 has a worm shaft 120 arranged below and parallel to the spool shaft 115, a slider member 121 moving in the forward and backward directions along the worm shaft 120, an intermediate gear 122 fixed on the fore end of the worm shaft 120, and two guide shafts 123a and 123b guiding the slider member 121 in the spool shaft direction.

The worm shaft 120 has intersecting spiral grooves 120a formed on its outer circumferential surface. On the rear end of the worm shaft 120, a first bearing 117a is fitted that is mounted to the rear wall portion 116, and on the fore-end thereof, a second bearing 117b is fitted that is mounted to the front wall portion 127. The first bearing 117a can be fitted from the front of the rear wall portion 116. The second bearing 117b can be fitted from the rear of the front wall portion 127. Both bearings 117a and 117b for supporting rotation are, for example, bushings made of a synthetic resin such as a polyacetal resin.

The rear end of the spool shaft 115 is non-rotatably fixed to the slider member 121 by two screws 121c and 121d. In the interior of the slider member 121, an engaging member 124 engaging with the spiral grooves 120a is fitted so as to freely pivot around an axis orthogonal to the worm shaft 120. By engagement of this engaging member 124 with the spiral grooves 120a, rotation of the worm shaft 120 is converted into reciprocation motion of the slider member 121.

The intermediate gear 122 meshes with a pinion gear 112. The worm shaft 120 and the guide shafts 123a and 123b, which are arranged parallel to and above and below the worm shaft 120, pass through the slider member 121. These guide shaft 123a and 123b guide the slider 121 in the forward and backward directions in the reel unit 2.

The worm shaft 120 and the guide shafts 123a and 123b are fitted from the rear through through-holes 140, 150a, and 150b that are formed in the rear portion of the reel body 102a. These through holes 140, 150a, and 150b are covered by a cover member 151. The outer circumferential surfaces of the guide shafts 123a and 123b that face the front face of the rear wall portion 116 have annular grooves 135a and 135b for preventing disengagement, respectively. A plate-shaped retainer member 130 is fitted into the annular grooves 135a and 135b. In the retainer member 130, a pair of U-shaped first retaining grooves 130a and 130b disposed above and below and fitted on the annular groove 135a and 135b, and a U-shaped second retaining groove 130c fitted to worm shaft 120 so as to retain the first bearing 117a are formed. The retainer member 130 is secured by being pressed by a lid member (not shown) screw-fastened to the reel body 102a.

With the retaining structure thus configured, the strength can be maintained higher than preventing disengagement by screw-fastening the retainer member on the rear face side of the rear wall portion, and moreover, assembling cost can be reduced since screw fastening becomes unnecessary.

Figure 16:
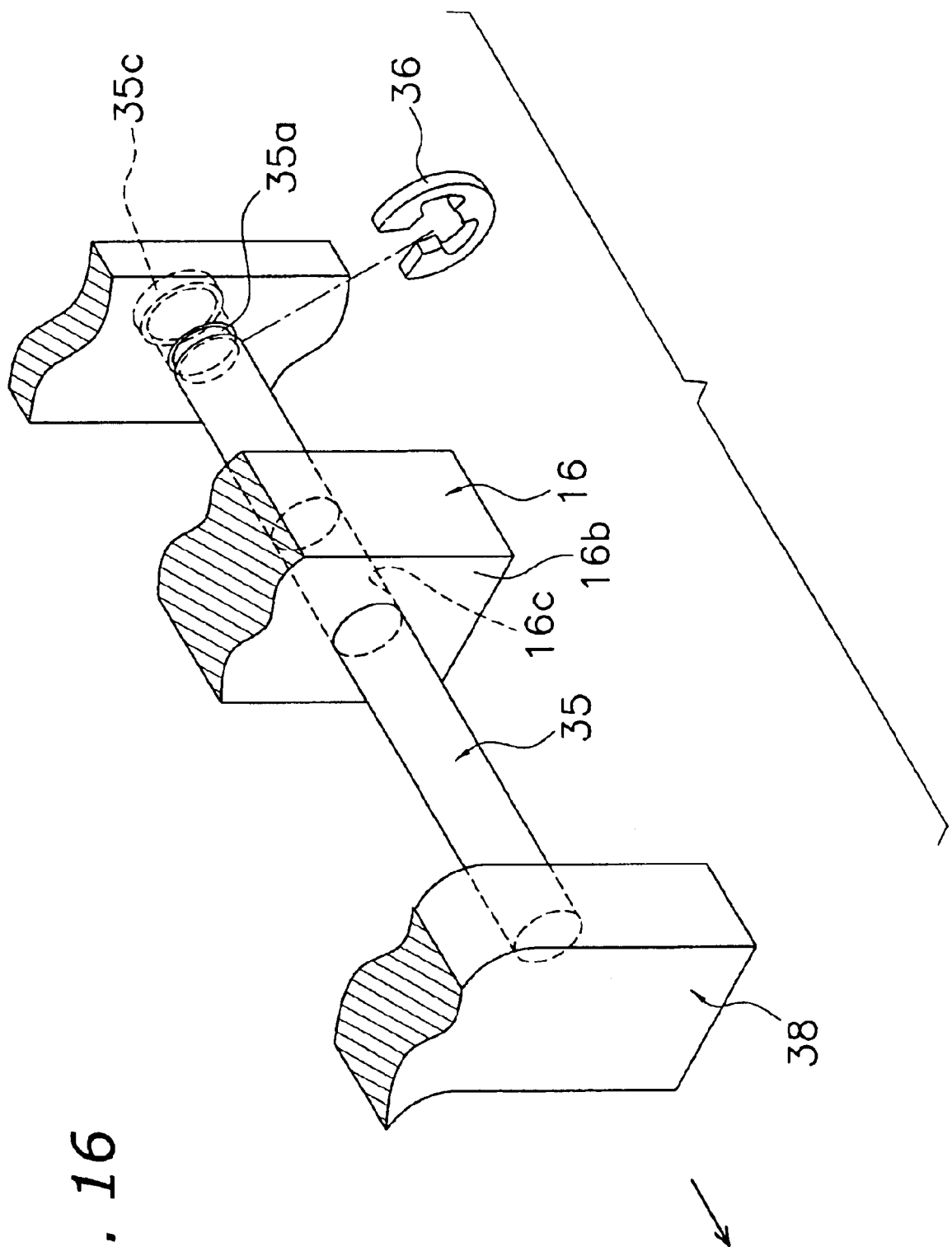
FIG. 16 is a schematic perspective view corresponding to FIG. 5, showing a mounting structure of the guide shaft in accordance with still another embodiment of the present invention.

(f) In the foregoing embodiment, disengagement of the guide shaft in the insertion direction is prevented by contact of the fore end of the guide shaft, but disengagement in the insertion direction may be achieved by providing a brim 35c (an example of interlocking portion) on the guide shaft, as shown in FIG. 16.

Under the present invention, preventing the guide shaft from disengaging can be achieved by a position-restricting portion, and therefore, it is no longer necessary
to prevent disengagement using complicated structures such as retainer members fixed by screws, and retaining structure for the guide shaft can be simplified. Moreover, since a retainer member needs not be fit at the rear of the reel unit, the space for mounting is unnecessary, and design constraints for the reel unit are reduced.

As used herein, the following directional terms "forward," "rearward," "above," "downward," "vertical," "horizontal," "below" and "transverse" as well as any other similar directional terms refer to those directions of a device equipped with the present invention. Accordingly, these terms, as utilized to describe the present invention should be interpreted relative to a device equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-245686. The entire disclosure of Japanese Patent Application No. 2002-245686 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spinning reel, comprising:
   a reel unit provided with a handle and a spool shaft, said reel unit including a reel body having a housing space in the interior thereof, and a lid member detachably fixed to said reel body and closing said housing space;

a rotor supported so as to be rotatable around said spool shaft;

a spool arranged in front of said rotor for winding fishing line, said spool being mounted fore-end wise on said spool shaft;

a sliding member mounted on the spool shaft immovably relative to said spool shaft at least in the spool shaft axial direction;

shifting means for reciprocating said sliding member in the spool shaft axial direction in cooperation with rotation of said the handle; and at least one guide shaft supported by said reel unit in a plurality of locations on an outer circumferential surface of said guide shaft for guiding said sliding member in a direction substantially parallel to said spool shaft, said guide shaft having a position-restricting portion for preventing said guide shaft from being disengaged from said reel unit in at least one axial direction, said position-restricting portion including an annular groove formed on said outer circumferential surface of said guide shaft and a plate-shaped member having a U-shaped groove that is detachably and reattachably fitted to said annular groove, said plate-shaped member being pressed toward said guide shaft by said lid member.

2. A spinning reel, comprising:

a reel unit provided with a handle and a spool shaft;

a rotor supported so as to be rotatable around said spool shaft;

a spool arranged in front of said rotor for winding fishing line, said spool being mounted fore-end wise on said spool shaft;

a sliding member mounted on the spool shaft immovably relative to said spool shaft at least in the spool shaft axial direction;

shifting means for reciprocating said sliding member in the spool shaft axial direction in cooperation with rotation of said handle; and at least one guide shaft supported by said reel unit in a plurality of locations on an outer circumferential surface of said guide shaft for guiding said sliding member in a direction substantially parallel to said spool shaft, said guide shaft having a position-restricting portion for preventing said guide shaft from being disengaged from said reel unit in at least one axial direction, said reel unit having a plurality of support portions that are formed thereon so as to be aligned with one another, said guide shaft being inserted, along the axial direction of said guide shaft through said plurality of support portions such that said outer circumferential surface of said guide shaft is entirely circumferentially supported by said plurality of support portions, said position-restricting portion including an annular groove formed on said outer circumferential surface of said guide shaft and a retainer member detachably and reattachably fitted to said annular groove, said retainer member contacting a side of one of said plurality of support portions opposite a side where said guide shaft is inserted, such that disengagement of said guide shaft from said support portions is prohibited in a direction opposite the direction in which said guide shaft is inserted into said support portions, said reel unit further including a positioning projection, and said guide shaft coming into contact with said positioning projection when said guide shaft is inserted from the rear of said reel unit, such that an insertion-direction position of said guide shaft is determined.

3. The spinning reel as set forth in claim 2, wherein:

said reel unit has a plurality of support portions that are formed thereon so as to be aligned with one another, said guide shaft being inserted, along the axial direction of said guide shaft through said plurality of support portions such that said outer circumferential surface of said guide shaft is entirely circumferentially supported by said plurality of support portions; and said position-restricting portion includes an annular groove formed on said outer circumferential surface of said guide shaft and a retainer member detachably and reattachably fitted to said annular groove, said retainer member contacting a side of one of said plurality of support portions opposite a side where said guide shaft is inserted, such that disengagement of said guide shaft from said support portions is prohibited in a direction opposite the direction in which said guide shalt is inserted into said support portions.

4. The spinning reel as set forth in claim 3, wherein said retainer member is a snap ring detachably and elastically locked in said annular groove.

5. The spinning reel as set forth in claim 3, wherein said retainer member is a retaining spring formed by bending a metal wire into a hairpin contour, and locked detachably and elastically in said annular groove.

6. The spinning reel as set forth in claim 3, wherein said retainer member is contacting one of said plurality of support portions on a side closer to a side of said reel unit on which fishing line is reeled out.

7. The spinning reel as set forth in claim 2, wherein said sliding means includes a rotating member having a cam, said rotating member being adapted to rotate around an axis substantially parallel to a rotational axis of said handle, in cooperation with rotation of said handle, and a cam-engaging groove provided on said sliding member and extending in a direction intersecting a direction of said spool shaft, said cam-engaging groove engaging said cam.

8. The spinning reel as set forth in claim 2, wherein said shifting means includes a worm shaft disposed substantially parallel to said spool shaft, intersecting spiral grooves being formed on a surface of said worm shaft;

an intermediate gear fixedly coupled to said worm shaft, said intermediate gear transmitting rotation of said handle to said worm shaft; and an engaging member pivotably accommodated in said sliding member and engaging said worm shaft.

9. A spinning reel, comprising:

a reel unit provided with a handle and a spool shaft;

a rotor supported so as to be rotatable around said spool shaft;

a spool arranged in front of said rotor for winding fishing line, said spool being mounted fore-end wise on said spool shaft;

a sliding member mounted on the spool shaft immovably relative to said spool shaft at least in the spool shaft axial direction;

shifting means for reciprocating said sliding member in the spool shaft axial direction in cooperation with rotation of said handle; and at least one guide shaft supported by said reel unit in a plurality of locations on an outer circumferential surface of said guide shaft for guiding said sliding member in a direction substantially parallel to said spool shaft, said guide shaft having a position-restricting portion for preventing said guide shaft from being disengaged from said reel unit in at least one axial direction, said reel unit having a plurality of support portions that are formed thereon so as to be aligned with one another, said guide shaft being inserted, along the axial direction of said guide shaft through said plurality of support portions such that said outer circumferential surface of said guide shaft is entirely circumferentially supported by said plurality of support portions, said position-restricting portion including an annular groove formed on said outer circumferential surface of said guide shaft and a retainer member detachably and reattachably fitted to said annular groove, said retainer member contacting a side of one of said plurality of support portions opposite a side where said guide shaft is inserted, such that disengagement of said guide shaft from said support portions is prohibited in a direction opposite the direction in which said guide shaft is inserted into said support portions, said guide shaft having an interlocking portion formed at an insertion-direction rear end portion, said interlocking portion interlocking said guide shaft with one of said plurality of support portions that is at rearmost end in the insertion directions, an insertion-direction position of said guide shaft being determined by interlocking of said interlocking portion into said support portion.

10. A spinning reel, comprising:

a reel unit provided with a handle and a spool shaft;

a rotor supported so as to be rotatable around said spool shaft;

a spool arranged in front of said rotor for winding fishing line, said spool being mounted fore-end wise on said spool shaft;

a sliding member mounted on the spool shaft immovably relative to said spool shaft at least in the spool shaft axial direction;

shifting means for reciprocating said sliding member in the spool shaft axial direction in cooperation with rotation of said handle; and at least one guide shaft supported by said reel unit in a plurality of locations on an outer circumferential surface of said guide shaft for guiding said sliding member in a direction substantially parallel to said spool shaft, said guide shaft having position-restricting portion for preventing said guide shaft from being disengaged from said reel unit in at least one axial direction, said reel unit having a plurality of support portions that are formed thereon and aligned along an axial direction, said guide shaft being inserted, along the axial direction of said guide shaft, through said plurality of support portions such that said outer circumferential surface of said guide shaft is entirely circumferentially supported by said plurality of support portions; and said position-restricting portion includes two annular grooves and two snap rings that are detachably and reattachably fitted to said annular grooves, such that disengagement of said guide shaft from said support portions is prevented in either axial direction.

* * * * *